(12) United States Patent
Tender

(10) Patent No.: US 9,531,027 B2
(45) Date of Patent: Dec. 27, 2016

(54) METHOD AND APPARATUS FOR GENERATING ELECTRICAL POWER USING SUNLIGHT AND MICROORGANISMS

(75) Inventor: Leonard M. Tender, Bethesda, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 1275 days.

(21) Appl. No.: 12/716,118

(22) Filed: Mar. 2, 2010

(65) Prior Publication Data

US 2010/0224246 A1 Sep. 9, 2010

Related U.S. Application Data

(60) Provisional application No. 61/156,903, filed on Mar. 3, 2009.

(51) Int. Cl.
| | | |
|---|---|---|
| H01L 31/00 | (2006.01) | |
| H01M 8/16 | (2006.01) | |
| H01M 8/06 | (2016.01) | |

(52) U.S. Cl.
CPC ............ *H01M 8/16* (2013.01); *H01M 8/0606* (2013.01); *Y02E 60/527* (2013.01)

(58) Field of Classification Search
CPC .............................. H01M 8/0606; H01M 8/16
USPC ............................................................ 429/2
See application file for complete search history.

(56) References Cited

U.S. PATENT DOCUMENTS

| | | | |
|---|---|---|---|
| 4,117,202 A | * | 9/1978 | Beck .................................. 429/2 |
| 5,427,871 A | | 6/1995 | Garshol et al. |
| 6,913,854 B1 | | 7/2005 | Alberte et al. |
| 7,550,224 B1 | | 6/2009 | Tender et al. |
| 8,148,019 B2 | | 4/2012 | Tender |
| 2010/0081014 A1 | | 4/2010 | Tyce et al. |

OTHER PUBLICATIONS

R.S. Berk and J.H. Canfield, "Bioelectrochemical Energy Conversion", Applied Microbiology, vol. 12 p. 10-12, 1964.*
Conlan, et al. Applied and Environmental Microbiology, Nov. 2005 p. 7442-7452. vol. 71, No. 11.*
Rosenbaum, et al. "In Situ Electrooxidationof photobiological hydrogen in a photobioelectrochemical fuel cell based on rhodobacter sphaeroides" Environ. Sci. Technol., 2005, 39, p. 6328-6333.*
Nandi, et al. "Microbial Production of Hydrogen" An Overview, Critical Reviews in Microbiology, 24, p. 61-84, 1998.*
LaLiberte, et al. "Survival of *Escherichia coli* in lake bottom sediment", Applied and Environmental Microbiology, 1982, 42, 623-628.*
Reimers et al., "Harvesting Energy from the Marine Sediment-Water Interface" Environ. Sci. Technol. 2001, 35, 192-195.

(Continued)

*Primary Examiner* — Marla D McConnell
(74) *Attorney, Agent, or Firm* — US Naval Research Laboratory; Joseph T. Grunkemeyer

(57) ABSTRACT

Systems and methods are presented for generating and storing electric power in which a microbial solar cell is provided in a sealed container with photosynthetic organisms that generate reactants of the microbial fuel cell and the products of the microbial fuel cell from sunlight received through the container.

25 Claims, 3 Drawing Sheets

(56) References Cited

OTHER PUBLICATIONS

Rosenbaum et al., "In Situ Electrooxidation of Photobiological Hydrogen in a Photobioelectrochemical Fuel Cell Based on Rhodobacter sphaeroides" Environ. Sci. Technol. 2005, 39, 6328-6333.

Rosenbaum et al., "Utilizing the green alga Chlamydomonas reinhardtii for microbial electricity generation: a living solar cell" Appl Microbiol Biotechnol (2005) 68: 753-756.

Tender et al., "Harnessing microbially generated power on the seafloor" Nat. Biotechnol., 20, 821-826 (2002).

Trammell et al., "Effects of Distance and Driving Force on Photoinduced Electron Transfer between Photosynthetic Reaction Centers and Gold Electrodes" J. Phys. Chem. C 2007, 111, 17122-17130.

\* cited by examiner

METHOD AND APPARATUS FOR GENERATING ELECTRICAL POWER USING SUNLIGHT AND MICROORGANISMS

REFERENCE TO RELATED APPLICATIONS AND INCORPORATION BY REFERENCE

This application claims priority to and the benefit of U.S. Provisional Patent Application Ser. No. 61/156,903, filed Mar. 3, 2009, entitled "Method and Apparatus for Generating Electrical Power using Sunlight and Microorganisms", the entirety of which is hereby incorporated by reference as if fully set forth herein. Reference is made to U.S. Pat. No. 5,427,871, issued Jun. 27, 1995 to Garshol et al. and entitled "Galvanic seawater cell"; U.S. Pat. No. 6,913,854, issued Jul. 5, 2005 to Alberte et al. and entitled "Method and apparatus for generating power from voltage gradients at sediment-water interfaces"; U.S. Pat. No. 7,550,224, issued Jun. 23, 2009 to Tender et al. and entitled "Apparatus equipped with metallic manganese anode for generating power from voltage gradients at the sediment-water interface"; and to U.S. Patent Application Publication No. 2006/0172186, published Aug. 3, 2006 to Tender and entitled "Method and apparatus for generating power from voltage gradients at sediment-water interfaces using active transport of sediment porewater", the entireties of which patents and published applications are hereby incorporated by reference as if fully set forth herein.

FIELD OF THE DISCLOSURE

The present disclosure relates generally to electric power generation and more particularly to systems and methods for generating electrical power using sunlight and microorganisms.

BACKGROUND

Electric power generation typically involves consumption of fossil fuels, transformation of water flow in hydroelectric generation plants, transformation of geothermal energy, electrochemical processes, or transformation of sunlight. Solar power generation is becoming more and more attractive for environmental reasons. Solar power conversion has thusfar largely involved use of semiconductor-based solar cells made from crystalline silicon, gallium arsenide, or other thin film inorganic materials to convert solar radiation to electrical power. Conventional solar cells, however, do not yet have long-term durability sufficient or high efficiency to encourage large-scale commercial adoption as an alternative to fossil fuel-based electric power generation. Benthic unattended generators (BUGS) have been developed, for example, as described in U.S. Pat. No. 6,913,854 incorporated herein, which provide for persistent power generation to power marine deployed sensors. These devices generate electrical power by oxidizing organic matter (fuel) residing in marine sediment pore water with oxygen (oxidant) in overlying water. Since the BUG device is open to allow replenishment of water, the power generation is generally persistent due to a constant supply of fuel and oxidant through diffusion, tidal pumping, and sediment resuspension, and thus the BUG is ideally suited for powering marine deployed sensors. Such devices, however, are restricted to marine applications, and cannot be connected in series. Consequently, BUG devices must be located in marine environments and require voltage conditioning circuitry to transform the low operating voltage (e.g., 0.35 V) to a useful system voltage (e.g., 3-12V) to operate conventional electronic devices, thereby preventing non-marine application and reducing the overall efficiency. Microbial solar cells have been proposed for converting biomass to hydrogen for electrode oxidation in fuel cells, and bio-inspired solar power generation has been proposed in which photoactive proteins such as reaction centers of photosynthetic bacteria are extracted from organisms. However, photoactive proteins have finite extracellular lifetimes typically much less than one year, and the light adsorption necessary for photosynthesis is very damaging to the photosynthetic proteins and that photosynthetic microorganism must actively repair them.

SUMMARY

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter. Non-semiconductor-based methods and systems are presented for generating electrical power from sunlight, in which a microbial energy conversion system employs microorganisms to generate electrical power from sunlight by photosynthetically replenishing reactants of a sealed microbial fuel cell and the products of the microbial fuel cell using light obtained through a sealed contained wall.

In accordance with one or more aspects of the present disclosure, an apparatus is provided for storing sunlight-derived energy and providing electrical power. The apparatus includes a container structure with first and second interior portions, at least one transparent or translucent wall portion that allows entry of external light into the first interior portion, and electrical connectors mounted provide coupling to an external electrical circuit. In certain embodiments, at least one wall seals the interior of the container structure. The apparatus further includes a catholyte and a cathode electrode in the first interior portion, and photosynthetic organisms within the catholyte in the first interior portion. An anolyte and an anode electrode are provided in the second interior portion and a semi-permeable barrier separates the catholyte from the anolyte. In certain embodiments, the semi-permeable barrier comprises at least one of a synthetic membrane, a synthetic membrane incorporating microorganisms, and a microbial biofilm. A first electrical conductor is coupled between the cathode electrode and the first electrical connector and a second electrical conductor is coupled between the anode electrode and the second electrical connector. In certain embodiments, the cathode electrode is a non-conductor that is non-corrosive in the catholyte, such as graphite, gold, carbon cloth, carbon fibers, steel, titanium, and/or platinum, where at least some of the photosynthetic microorganisms are on the cathode electrode, and wherein a cathode reaction at the cathode electrode is catalyzed by microorganisms in the catholyte. In various embodiments, moreover, the anode electrode is non-corrosive in the anolyte, such as graphite, gold, carbon cloth, carbon fibers, steel, titanium, and/or platinum, wherein an anode reaction at the anode electrode is catalyzed by microorganisms in the anolyte. In certain embodiments, the catholyte and the photosynthetic organisms are obtained from seawater, and the anolyte is obtained from anoxic marine sediment. The apparatus thus provides a photosynthetically replenished microbial solar cell with the capability of electrical power generation during light and dark periods.

Further aspects of the disclosure provide a method for storing sunlight-derived energy and/or providing electrical power. The method includes reducing at least one oxidant of a catholyte to remove electrons from a cathode electrode and to generate at least one cathode byproduct, oxidizing at least one reductant of an anolyte to transfer electrons to an anode electrode and to generate at least one anode byproduct, conducting electrons as electrical current from the anode electrode through an external circuit to the cathode electrode, transferring ions between the anode electrode and the cathode electrode via a semi-permeable barrier to maintain charge balance, and exposing photosynthetic organisms in the catholyte to light to regenerate the at least one reductant and the at least one oxidant using the at least one anode byproduct and the at least one cathode byproduct. In certain embodiments, photosynthetic organisms are exposed to light intermittently, where the conduction of electrical current from the anode electrode through the external circuit to the cathode electrode continues during time when the photosynthetic organisms are not exposed to light.

In accordance with other aspects of the disclosure, a microbial solar cell is provided, which includes a sealed container and a microbial fuel cell. The fuel cell includes a cathode electrode within a catholyte in a first interior portion of the container, an anode electrode within an anolyte in a second interior portion of the container, and electrical conductors electrically coupling the electrodes to an external load outside the container. The microbial solar cell also includes photosynthetic organisms within the first interior portion of the container that generate reactants of the microbial fuel cell and the products of the microbial fuel cell from sunlight.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION OF THE DISCLOSURE

Figure 1:
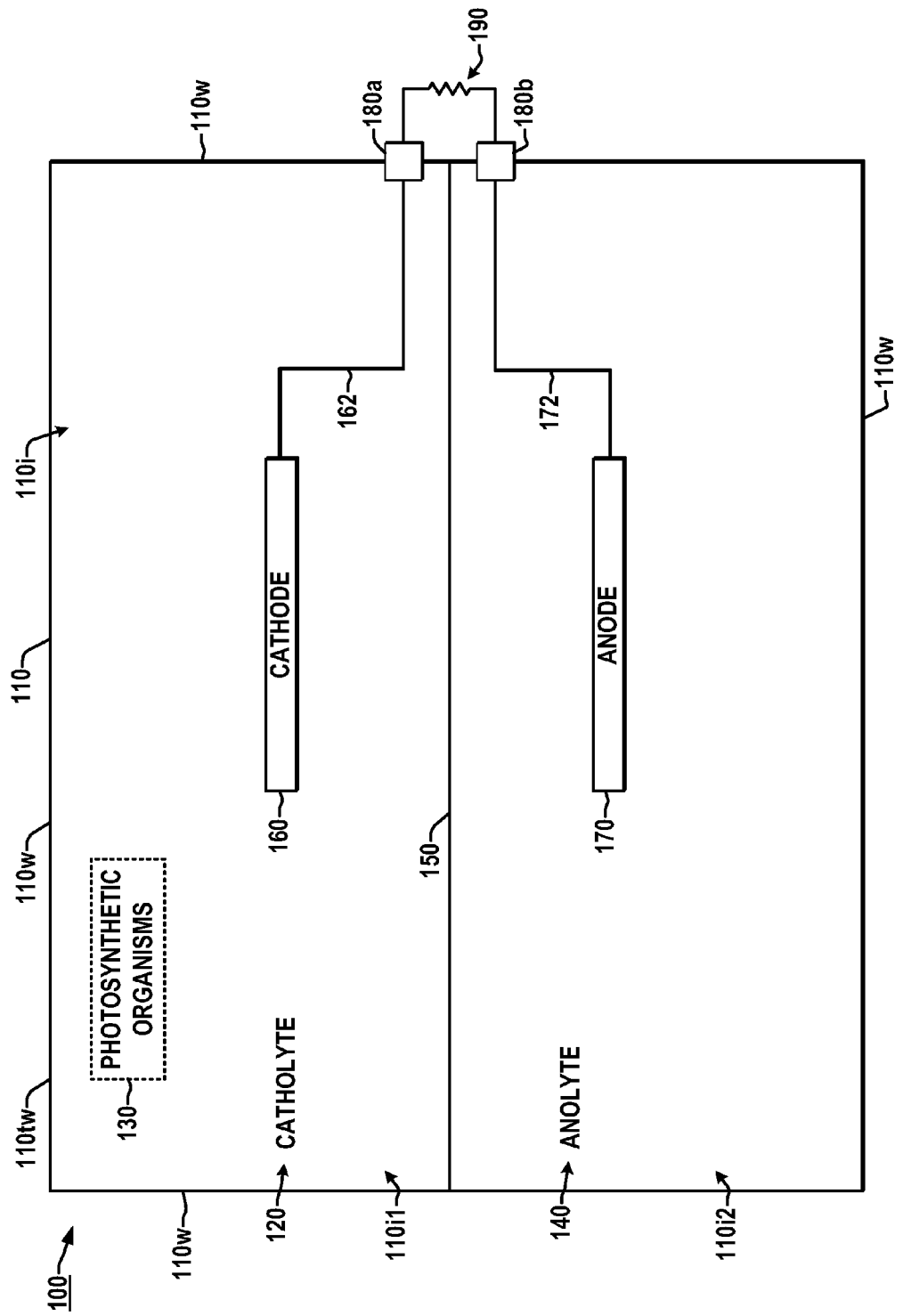
FIG. 1 is a side elevation view illustrating an exemplary apparatus including a microbial solar cell for storing sunlight-derived energy and/or providing electrical power in accordance with one or more aspects of the disclosure.

One or more embodiments or implementations are hereinafter described in conjunction with the drawings, where like reference numerals are used to refer to like elements throughout, and where the various features are not necessarily drawn to scale. The disclosure provides apparatus and methods for electrical power generation and energy storage which can be successfully implemented to avoid or mitigate the above mentioned problems and shortcomings associated with conventional solar cell technology and which advantageously avoids the consumption of fossil fuels and the associated environmental impact.

FIG. 1 illustrates an exemplary electrical power conversion/storage apparatus 100 including a microbial solar cell, referred to herein as a solar benthic unattended generator or solar BUG, which is operable to store energy and/or to provide electrical power derived from external light such as sunlight. The apparatus 100 includes an enclosure or container structure 110 with one or more walls 110$w$ defining an interior with first and second (e.g., upper and lower) interior portions 110$i$1 and 110$i$2, respectively, where at least one wall 110$w$ of the container 110 includes at least one transparent or translucent portion 110$tw$ allowing external light to enter all or part of the first interior portion 110$i$1. The container 110 includes first and second electrical connectors 180$a$ and 180$b$, respectively, which are electrically coupleable to an external circuit 190. The connectors 180 are mounted to wall 110$w$. The container 110 in certain embodiments is a sealed structure with the wall(s) 110$w$ sealing the interior 110$i$ of the container structure 110 in air-tight fashion.

An aqueous catholyte 120 is provided in the first interior portion 110$i$1 above a semi-permeable barrier 150, and photosynthetic organisms 130 are provided within the catholyte 120 in the first interior portion 110$i$1. An anolyte 140 is provided in the second interior portion 110$i$2, and the semi-permeable barrier 150 separates the catholyte 120 from the anolyte 140. A cathode electrode 160 is situated within the catholyte 120 in the first interior portion 110$i$1, with a first electrical conductor 162 coupled between the cathode electrode 160 and the first electrical connector 180$a$. In certain embodiments, the cathode electrode 160 is a non-conductor that is non-corrosive in the catholyte 120. Suitable materials for the cathode electrode include without limitation graphite, gold, carbon cloth, carbon fibers, steel, titanium, and platinum. In certain embodiment, the cathode reaction at the cathode electrode 160 is catalyzed by microorganisms in the catholyte 120. In certain embodiments, moreover, the catholyte 120 and the photosynthetic organisms 130 are obtained from seawater (e.g., photosynthetic microorganisms or inoculum thereof, such as cyanobacteria). In certain embodiments, at least some of the photosynthetic microorganisms 130 are on the cathode electrode 160.

An anode electrode 170 is located within the anolyte 120 in the second interior portion 110$i$2 and a second electrical conductor 172 is coupled between the anode electrode 170 and the second electrical connector 180$b$. In operation, electrons are conducted as electrical current from the anode electrode 170 through the external circuit 190 to the cathode electrode 160 to form an electrical circuit, with the apparatus 100 providing electrical power to the load circuit 190. The anode electrode 170 may be any suitable material, such as graphite, gold, carbon cloth, carbon fibers, steel, titanium, and platinum, etc., and is preferably non-corrosive in the anolyte 120. An anode reaction at the anode electrode 170 is catalyzed in certain embodiments by microorganisms in the anolyte 120, wherein the anolyte 140 is obtained in certain embodiments from anoxic marine sediment. The semi-permeable barrier 150 that separates the anolyte 120 and the catholyte 120 in certain embodiments is a synthetic membrane, a synthetic membrane incorporating microorganisms, or a microbial biofilm.

The apparatus 100 thus constitutes a microbial solar cell that includes a microbial fuel cell formed by the cathode electrode 160 within the catholyte 120, the anode electrode 170 within the anolyte 120, and the conductors electrically coupling the electrodes 160 and 170 to the external load 190 outside the container 110. The solar cell also includes the photosynthetic organisms 130 within the first interior portion 110i1 of the container 110 that generate reactants of the microbial fuel cell and the products of the microbial fuel cell from sunlight. In particular embodiments, the apparatus 100 employs microbial consortia including photosynthetic algae and/or bacteria and non-photosynthetic bacteria to photosynthetically convert solar radiation to electrical power, and the microbial consortia renew themselves over time, whereby the apparatus 100 is biologically self-repairing.

Figure 2:
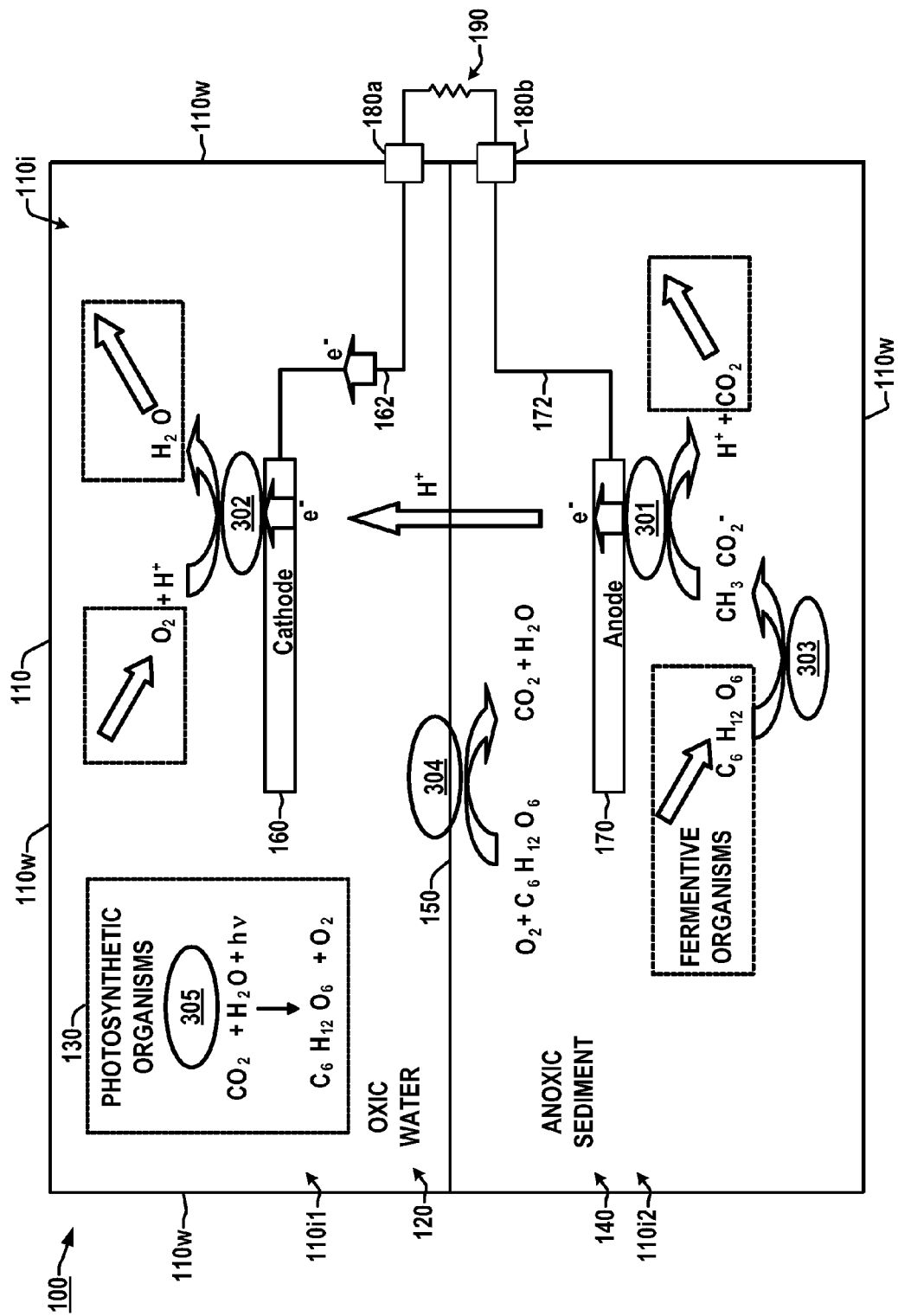
FIG. 2 is a side elevation view of an embodiment of the microbial solar cell showing further details of photosynthetic, cathodic, and anodic reactions.

FIG. 2 illustrates an embodiment of the microbial solar cell apparatus 100 in which the catholyte 120 includes oxic water obtained from seawater and the anolyte 140 includes anoxic marine sediment, where exemplary photosynthetic, cathodic, and anodic reactions are depicted in the apparatus 100. In many marine environments substantial organic matter resides in sediment pore water, and is typically derived from settlement of dead phytoplankton from overlying water and/or from erosion of adjacent land. In addition, oxidants such as oxygen and sulfate are supplied into sediment pore water by diffusion from overlying water and by mechanisms driven by motion of overlying water (e.g., tidal pumping and/or resuspension). In such environments, the combination of organic matter and oxidants support microbial activity, and the amount of organic matter often far exceeds the amount of oxidant resulting in microbial depletion of oxidants in sediment. In such sediments, the anode electrode 170 acts as a potent oxidant to oxygen through the electrical connection through the intervening circuit 172, 180b, 190, 162, and the cathode electrode 160 in the overlying water (catholyte 120, such as oxic marine water or inoculum thereof). When the anode electrode 170 is embedded into the sediment anolyte 140 (e.g., anoxic marine sediment or inoculum thereof) in certain embodiments, a biofilm forms on the anode electrode 170 enriched in sedimentary mineral-reducing microorganisms which are able to directly utilize the anode electrode 170 as oxidant. These microorganisms catalyze oxidation of sedimentary acetate with coupled reduction of the anode electrode 170. Acetate consumed at the anode electrode 170, in turn, is generated by fermentation of glucose by other microorganisms in the sedimentary anolyte 140. The byproducts of the biofilm catalyzed anode reaction 301 are carbon dioxide ($CO_2$) and protons ($H^+$). The electrons ($e^-$) flow through the external circuit 172, 180b, 190, and 162 to the cathode electrode 160. In this example, a biofilm formed on the cathode electrode 160 catalyzes oxidation of the cathode electrode 160 with coupled reduction of oxygen and reaction with protons in overlying water 120 to form water ($H_2O$).

Another reaction 304 at a microbial oxygen barrier 150 involves consumption of glucose with oxygen and formation of carbon dioxide ($CO_2$) and water ($H_2O$) and is thermodynamically favorable enabling power to be expended in the external circuit 190. Thermodynamic favorability of the net BUG reaction manifests as voltage measured between the cathode and anode electrodes 160 and 170. When a resistance of the external circuit 190 is high, no current flows and the voltage (potential of cathode electrode 160 minus that of the anode electrode 170, referred to herein as an open circuit voltage) is approximately 0.75 V depending on the specific environment. As the resistance of the external circuit 190 is lowered, the cell current increases and the voltage decreases in a fuel cell-like manner. In certain embodiments, the cell power can be optimized at a voltage that is approximately one half of the open circuit voltage. In one particular embodiment, the catholyte 120 is comprised of seawater and the anolyte 140 is comprised of marine sediment, using graphite cathode and anode electrodes 160, 170.

At the anode electrode 170 a biofilm forms of marine sediment microorganisms that are believed to catalyze the cathode oxidation of acetate generating carbon dioxide and protons. The protons diffuse through the sediment 140, the barrier 150, and seawater 120 to the cathode electrode 160. The carbon dioxide diffuses through the sediment 140 and the barrier 150 to the seawater 120. Electrons acquired at the anode electrode 170 are conducted through the external circuit as electrical circuit. The protons ($H^+$), being positively charged, act to balance the negative charge of the electrons. At the cathode electrode 160, oxygen ($O_2$) is reduced to water ($H_2O$) by a biofilm catalyzed cathode reaction 302 with electrons provided by the cathode electrode 160 and protons provided by the anode electrode 170. Without wishing to be tied to any particular theories, the oxygen consumed by the cathode electrode 160 is believed to be generated by the photosynthetic microorganisms 130 present in the seawater catholyte 120 (reaction 305 in FIG. 2).

The acetate ($CH_3\ CO_2^-$) consumed at the anode electrode 170 is believed to be generated (fermentative reaction 303) from fermentative microorganisms in the sediment anolyte 140 that ferment glucose generated by the photosynthetic microorganisms 130 in seawater that diffuses from the catholyte 120 through the barrier 150 into the sediment anolyte 140. The barrier 150 between oxygenated water 120 and the oxidant-depleted sediment 140 is maintained in one example by oxygen consuming (aerobic) microorganisms in a topmost sediment layer (e.g., millimeters thick) that consume all of the oxygen supplied into the sediment 140 by the overlying water 120.

The carbon dioxide ($CO_2$) generated by the anode electrode 170 and water generated by the cathode electrode 160 are believed to be converted into the oxygen consumed by the cathode electrode 160 and the glucose that is converted to acetate and consumed at the anode electrode 170 by the photosynthetic microorganisms 130 when illuminated by sunlight. Microorganisms on the sediment surface barrier 150 consume oxygen and thereby keep the oxidant away from the anode electrode 170.

Thus, the apparatus 100 uses external light obtained through the transparent wall portion(s) 110tw to photosynthetically convert the BUG products, carbon dioxide and water, to the reactants, glucose and oxygen. As a result, the apparatus 100 does not require an endless flux of reactants from sediment and seawater to persistently generate power but recycles the products to regenerate the reactants, as was the case with open marine-based Benthic generators. The provision of the photosynthetic microorganisms 150 allows the apparatus 100 to operate in any location, such as in a roof top solar driven fuel cell installation. In this regard, certain embodiments employ a sealed and transparent container 110, for example, of length 15", width 9", and height 3.5", approximately half-filled with oxidant depleted (anoxic) marine sediment anolyte 140 collected from a shallow coastal environment overlaid with seawater (oxic water catholyte) 120 collected from the same environment.

The anode electrode 170 is embedded into the sediment anolyte 140 and electrically connected by an external circuit 190 to a cathode electrode 160 in the overlying water catholyte 120. In this embodiment, the anode electrode 170 is a graphite plate having length 12", width 6", and thickness of 1/8" embedded approximately 1" deep into the sediment anolyte 140 roughly parallel with the bottom of the container 110 and with the sediment surface 150. The cathode electrode in this example is a 1-meter long graphite bottle brush electrode (e.g., of the type described in U.S. Pat. No. 5,427,871, incorporated herein by reference, such as may be used for galvanic seawater batteries and used in prototype BUGS. Electrical connection to each electrode 160, 170 may be made in any suitable manner, such as was done in the references incorporated above, with the electrical leads were passed through sealed holes in container 110 (e.g., connections 180 in FIGS. 1 and 2).

It is believed that the photosynthetic microorganisms 130 are initially present in the original sea water sample in relatively small amounts, but are thereafter enriched when used in well-lit installations of the apparatus 100, since the new environment in the cell 100 (e.g., in a closed and shallow transparent container 110 in direct sunlight) is more favorable than the original sea bed location with respect to available light. These organisms 130 utilize incoming sunlight to generate oxygen and glucose from carbon dioxide supplied by the anodic biofilm and water supplied by the cathodic biofilm. While not wishing to be tied to any particular theory, it is believed that mass transport of chemical species within the apparatus 100 may result from diffusion and convection driven by radiant heating due to sunlight, and that so long as acetate is supplied to the anode electrode 170 via glucose fermentation in the sediment 140 and oxygen to the cathode electrode 160, electrons will flow through the external circuit 190 to thus generate output electrical power. Thus, incorporation of the photosynthetic microorganisms or inoculum thereof 130 recycles the electrode products (carbon dioxide and water) forming the electrode reactants (glucose and oxygen), by which electrical power can be generated from sunlight entirely through operation of microorganisms in the apparatus 100.

In one example, the apparatus 100 can be constructed using a container 110 with a volume of four liters (e.g., 10 cm height, 22 cm maximum length×22 cm maximum width) fashioned from a sealable transparent polycarbonate food storage container (e.g., Premier 4-cup, Rubbermaid) filled with marine sediment anolyte 140 to a height of about 2.5 cm from the container bottom. The sediment 140 in this example is overlaid with seawater catholyte 120 to a total height of about 9 cm from the container bottom leaving approximately 1 cm of head space. The cell 100 includes a 10.2 cm-long×10.2 cm-wide×0.32 cm-thick graphite plate anode electrode 170 sanded and rinsed with grade GS-10 distilled water from Graphite Engineering, Inc., which is embedded in the sediment 140 at the height of 1.3 cm from the container bottom. The anode electrode 170 is aligned parallel with the sediment surface and centered with respect to the container footprint. The cathode electrode 160 in this embodiment is a graphite plate similar or identical to the anode electrode 170 but including a number of (e.g., five) evenly-spaced 1.3 cm diameter holes. The cathode electrode 160 is positioned parallel to the anode electrode 170 at a height of about 8 cm in the overlying seawater catholyte 120 and centered with respect to container footprint. In this embodiment, a 3.0 liter volume of overlying seawater catholyte 120 is initially saturated in oxygen (e.g., 8.2 mg $L^{-1}$ at 25° C. and sea level), and a 1 liter volume of wet sediment anolyte 140 is provided in the second portion 110$i$2 with approximately 6% organic matter content by dry weight.

The above described examples are representative of certain implementations of a photosynthetically self-replenishing solar cell apparatus, wherein may different embodiments can be constructed within the scope of the present disclosure. Other contemplated embodiments may include a large surface area multilayered sheet structure, which can scale in size up to many square meters to capture proportionally large amounts of solar energy depending up the scale of power output required. The sheet could be as thin as a few millimeters thick to reduce resistance to mass transport of reactants and products. These embodiments may include a transparent top layer above a thin layer cathodic media containing photosynthetic microorganisms optimized for photosynthetic generation of oxygen and glucose from carbon dioxide and water and optimized for operation of the cathode. Under that is a thin layer porous cathode coated with biofilm optimized for catalytic reduction of oxygen with concerted reaction with protons to form water, above a porous oxygen barrier coated with biofilm optimized for oxygen depletion and for mass transport of carbon dioxide and protons from the anode to the cathode and glucose from the cathode to the anode. A thin layer porous anode is under the barrier layer, and is coated with biofilm optimized for fermentation of glucose to acetate and catalytic oxidation of acetate to form carbon dioxide and protons. Under the anode layer is a thin layer anodic media optimized for operation of the anode, which is located above a bottom reflective structural layer. Layering of the third through fifth mentioned layers can be implemented as found in the known multilayer electrode assembly (MEA) design approach for fuel cells. In this regard, MEAs can be employed to minimize internal resistance to proton mass transport from the anode to the cathode in order to maximize power output, and the internal resistance to mass transport of carbon dioxide, glucose and protons within a photosynthetically self-replenishing organic solar cell 100 can be minimized or reduced by this architecture. In operation, carbon dioxide generated at or in the cathode layer diffuses and/or is transported through convection directly through the anode layer to the cathode layer through the intervening oxygen barrier layer, and glucose generated at/in the cathode diffuses/convects directly through the cathode to the anode through the intervening oxygen barrier layer. The resistance to these mass transport processes is reduced by maintaining the device as thin as possible, which also helps to increase the overall power output for a sheet of fixed surface area.

Other exemplary alternate embodiments or variations may include: replacing the sedimentary anolyte 140 with an aqueous anolyte media to increase the rate of mass transport at the anode electrode 170; using metabolically engineered cyanobacteria that excrete glucose in high yield and glucose-metabolizing, electrode-reducing microorganisms to catalyze the anode oxidation of glucose thereby eliminating the need for the fermentative organisms; electrochemically adapting the anode and cathode microbial catalysts to generate current densities greater than 1 W $m^{-2}$ of electrode geometric surface area; optimization of the cell design to enable the most effective anode and cathode geometric surface areas within a given cell footprint by using vertical electrode arrays; scaling the cell volume in order to accumulate excess glucose and oxygen generated during sunlight for electricity generation at night; and maximizing mass transport due to diffusion and convection from radiant heating. With respect to diffusion, for example, the expected current density for a cathode electrode 160 surrounded by a hypothetical 1 cm wide oxygen depletion zone (assuming no other limitations) can be estimated as ca. 20 A $m^{-2}$ from Fick's law of diffusion: $i=nFAD(\Delta C/\Delta x)$, where i is current (A), n=4 (electrons per equivalent of oxygen reduced), F is the Faraday constant (96 487 C), A is the anode geometric surface area (e.g., 10,000 $cm^2$), D is the diffusion coefficient of oxygen in water (e.g., $1\times10^{-5}$ cm$^2$ s$^{-1}$ at 25° C.), C is oxygen solubility in water (e.g., 0.5 M at 25° C.), and x is the example depletion layer thickness (e.g., 1 cm). The analogous calculation for an anode yields a current density of 740 A m$^{-2}$ where n=24, D is the diffusion coefficient of glucose in water (ca. $6.6\times10-6$ cm$^2$ s$^{-1}$ at 25° C.), and C is the solubility of glucose in water (4.8 M at 25° C.).

Figure 3:
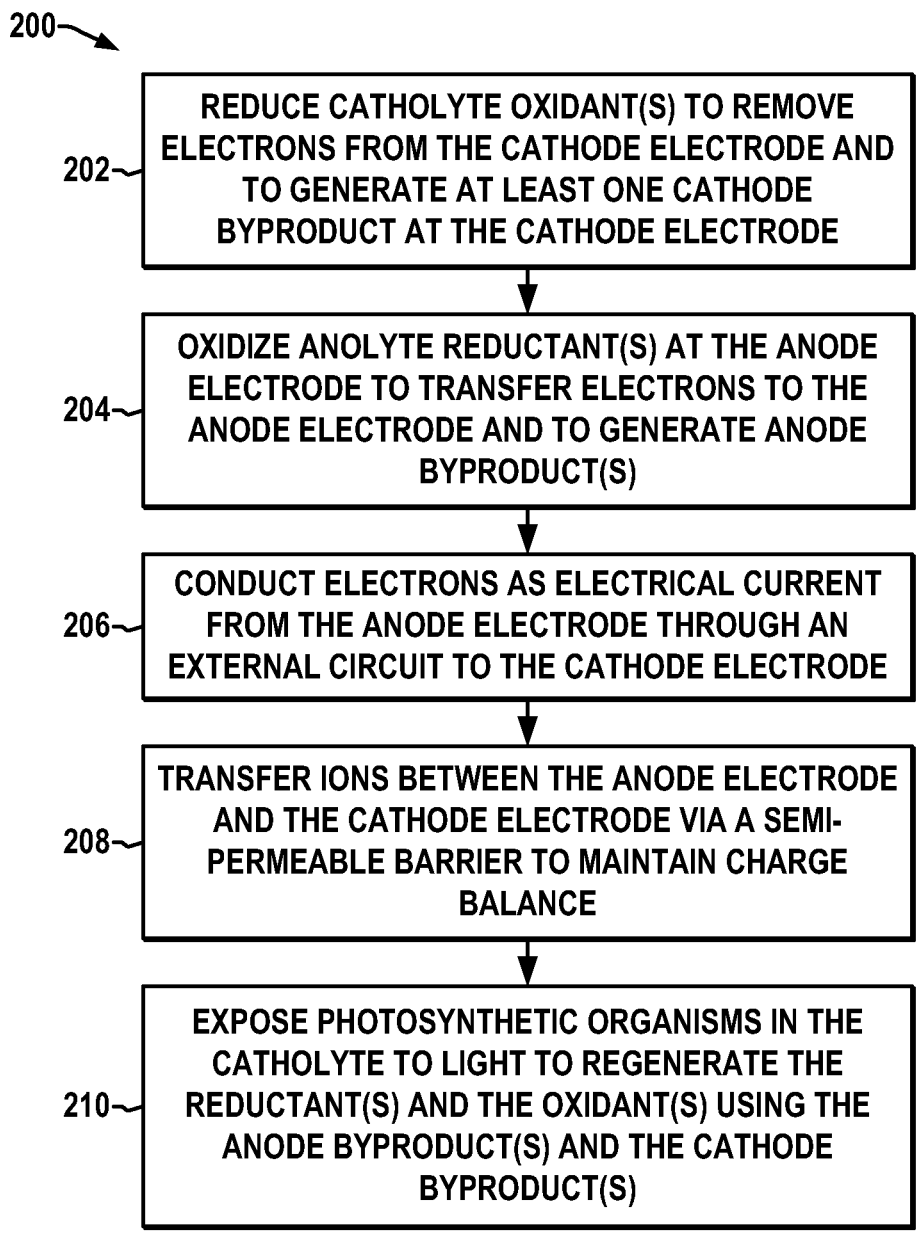
FIG. 3 is a flow diagram illustrating an exemplary method for storing sunlight-derived energy and providing electrical power in accordance with the present disclosure.

Referring now to FIG. 3, an exemplary method 200 is illustrated for storing sunlight-derived energy and/or for generating or providing electrical power. The method includes reducing one or more oxidants at 202 of a catholyte 120 to remove electrons from a cathode electrode 160 and to generate one or more cathode byproducts. At 204, one or more reductants of an anolyte 140 are oxidized to transfer electrons to an anode electrode 170 and to generate at least one anode byproduct. Electrons are conducted at 206 as electrical current from the anode electrode 170 through an external circuit 190 to the cathode electrode 160, and ions are transferred at 208 between the anode electrode 170 and the cathode electrode 160 via a semi-permeable barrier 150 to maintain charge balance. At 210, photosynthetic organisms 130 in the catholyte 120 are exposed to light to regenerate at least one reductant and at least one oxidant using the anode and cathode byproducts. In certain embodiments where the photosynthetic organisms 130 are exposed to light intermittently, the conduction of electrical current from the anode electrode 170 through the external circuit to the cathode electrode 160 at 206 continues during time when the photosynthetic organisms 130 are not exposed to light.

The apparatus 100 thus avoids the high initial cost and limited operational lifetime of semiconductor-based solar cells by using photosynthetically self-repairing benthic microbial fuel cells (BFMCs) to provide durable land-based photoelectrochemical solar cells that utilize sunlight to regenerate the electrode reactants from the electrode products.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. An apparatus for storing sunlight-derived energy and providing electrical power comprising:
 a container structure, comprising:
  at least one wall defining an interior including a first interior portion, and a second interior portion, the at least one wall including at least one transparent or translucent portion allowing external light to enter the first interior portion; and
  first and second electrical connectors mounted to the at least one wall and electrically coupleable to an external circuit;
 an aqueous catholyte comprising seawater and photosynthetic organisms collected from a coastal environment in the first interior portion;
 an anolyte in the second interior portion;
  wherein the anolyte comprises marine sediment collected from the same coastal environment as the seawater;
 a semi-permeable barrier separating the catholyte from the anolyte;
 a cathode electrode within the catholyte in the first interior portion;
 a first electrical conductor coupled between the cathode electrode and the first electrical connector;
 an anode electrode within the anolyte in the second interior portion; and
 a second electrical conductor coupled between the anode electrode and the second electrical connector.

2. The apparatus in claim 1 wherein at least some of the photosynthetic microorganisms are on the cathode electrode.

3. The apparatus of claim 2,
 wherein the anode electrode is non-corrosive in the anolyte, and
 wherein the cathode electrode is a conductor that is non-corrosive in the catholyte.

4. The apparatus of claim 2, wherein the cathode electrode comprises at least one of graphite, gold, carbon cloth, carbon fibers, steel, titanium, and platinum.

5. The apparatus of claim 4, wherein the anode electrode comprises at least one of graphite, gold, carbon cloth, carbon fibers, steel, titanium, and platinum.

6. The apparatus of claim 2, wherein the anode electrode comprises at least one of graphite, gold, carbon cloth, carbon fibers, steel, titanium, and platinum.

7. The apparatus of claim 2, wherein the at least one wall seals the interior of the container structure.

8. The apparatus of claim 2, wherein a cathode reaction at the cathode electrode is catalyzed by microorganisms in the catholyte.

9. The apparatus of claim 8, wherein an anode reaction at the anode electrode is catalyzed by microorganisms in the anolyte.

10. The apparatus of claim 2, wherein an anode reaction at the anode electrode is catalyzed by microorganisms in the anolyte.

11. The apparatus of claim 2, wherein the semi-permeable barrier comprises at least one of a synthetic membrane, a synthetic membrane incorporating microorganisms, and a microbial biofilm.

12. The apparatus of claim 1, wherein the anode electrode is non-corrosive in the anolyte, and wherein the cathode electrode is a conductor that is non-corrosive in the catholyte.

13. The apparatus of claim 1, wherein the cathode electrode comprises at least one of graphite, gold, carbon cloth, carbon fibers, steel, titanium, and platinum.

14. The apparatus of claim 13, wherein the anode electrode comprises at least one of graphite, gold, carbon cloth, carbon fibers, steel, titanium, and platinum.

15. The apparatus of claim 1, wherein the anode electrode comprises at least one of graphite, gold, carbon cloth, carbon fibers, steel, titanium, and platinum.

16. The apparatus of claim 1, wherein the at least one wall seals the interior of the container structure.

17. The apparatus of claim 1, wherein a cathode reaction at the cathode electrode is catalyzed by microorganisms in the catholyte.

18. The apparatus of claim 17, wherein an anode reaction at the anode electrode is catalyzed by microorganisms in the anolyte.

19. The apparatus of claim 1, wherein an anode reaction at the anode electrode is catalyzed by microorganisms in the anolyte.

20. The apparatus of claim 1, wherein in the semipermeable barrier comprises at least one of a synthetic membrane, a synthetic membrane incorporating microorganisms, and a microbial biofilm.

21. A microbial solar cell, comprising:
a sealed container;
a microbial fuel cell with a cathode electrode within a catholyte comprising seawater and photosynthetic organisms collected from a coastal environment in a first interior portion of the container, an anode electrode within an anolyte in a second interior portion of the container, and electrical conductors electrically coupling the electrodes to an external load outside the container;
wherein the anolyte comprises marine sediment collected from the same coastal environment as the seawater; and
wherein the photosynthetic organisms within the first interior portion of the container generate reactants of the microbial fuel cell and the products of the microbial fuel cell from sunlight.

22. The apparatus of claim 1, wherein the photosynthetic organisms are bacteria.

23. The microbial solar cell of claim 21, wherein the photosynthetic organisms are bacteria.

24. The apparatus of claim 1, wherein the anolyte comprises:
fermentative microorganisms that convert glucose to acetate; and
microorganisms that catalyze oxidation of acetate.

25. The microbial solar cell of claim 21, wherein the anolyte comprises:
fermentative microorganisms that convert glucose to acetate; and
microorganisms that catalyze oxidation of acetate.

* * * * *